United States Patent
Pribbanow

(10) Patent No.: US 7,465,213 B1
(45) Date of Patent: Dec. 16, 2008

(54) WILD GAME CALL

(76) Inventor: Troy T. Pribbanow, 2565 W. 4800 South, Roy, UT (US) 84067

( * ) Notice: Subject to any disclaimer, the term of this patent is extended or adjusted under 35 U.S.C. 154(b) by 650 days.

(21) Appl. No.: 10/377,941

(22) Filed: Mar. 1, 2003

Related U.S. Application Data

(60) Provisional application No. 60/361,046, filed on Mar. 1, 2002.

(51) Int. Cl.
 *A63H 5/00* (2006.01)
 *G10D 13/08* (2006.01)
(52) U.S. Cl. .................. 446/202; 446/207; 446/208; 84/330; 84/402; 84/377
(58) Field of Classification Search ......... 446/202–209; 84/377, 402, 330
See application file for complete search history.

(56) References Cited

U.S. PATENT DOCUMENTS

| | | | | | |
|---|---|---|---|---|---|
| 747,078 | A | * | 12/1903 | Leipold | 446/202 |
| 1,383,878 | A | * | 7/1921 | Taylor | 446/206 |
| 2,551,367 | A | * | 5/1951 | Fahey | 446/207 |
| 3,054,216 | A | * | 9/1962 | Testo | 446/208 |
| 3,466,794 | A | * | 9/1969 | Pritchard et al. | 446/206 |
| 3,802,120 | A | * | 4/1974 | Erhart | 446/77 |
| 3,928,935 | A | * | 12/1975 | Beadles, Jr. | 446/208 |
| 4,737,130 | A | * | 4/1988 | Mann | 446/208 |
| 4,821,670 | A | * | 4/1989 | Foxcroft et al. | 446/205 |
| 4,888,903 | A | * | 12/1989 | Knight et al. | 446/207 |
| 5,160,815 | A | * | 11/1992 | Prater | 181/182 |
| 5,735,725 | A | * | 4/1998 | Primos | 446/207 |
| 5,885,125 | A | * | 3/1999 | Primos | 446/207 |
| 5,885,126 | A | * | 3/1999 | Carlson | 446/208 |
| 6,120,341 | A | * | 9/2000 | Hafford | 446/208 |
| 6,413,139 | B1 | * | 7/2002 | Douglas | 446/204 |
| 6,413,140 | B1 | * | 7/2002 | Primos | 446/207 |
| 6,491,564 | B1 | * | 12/2002 | Miller | 446/207 |
| 2002/0061703 | A1 | * | 5/2002 | Greenwaldt | 446/202 |

* cited by examiner

*Primary Examiner*—Gene Kim
*Assistant Examiner*—Urszula Cegielnik
(74) *Attorney, Agent, or Firm*—Fehr Law Firm; Thompson E. Fehr

(57) ABSTRACT

A wild game call has a single inlet passage into which a user blows to generate sounds that simulate the natural sounds produced by the particular animal being called or attracted. The call includes a splitter that splits the single air inlet passage into a plurality of outlet passages. The sound either is generated in the single air passage or passes into the single air passage from the user and is directed into the plurality of outlet passages to produce the final output sound from the call. The plurality of outlet passages can be configured to produce subtle differences in the sound passing through a passage to provide a combination of sounds more closely simulating the natural animal sound than can be produced in only a single outlet passage. Various sound chamber can be added to the outlet passages to modify the sound emanating from that passage in a desired manner.

16 Claims, 5 Drawing Sheets

WILD GAME CALL

RELATED APPLICATION

Figure 1:
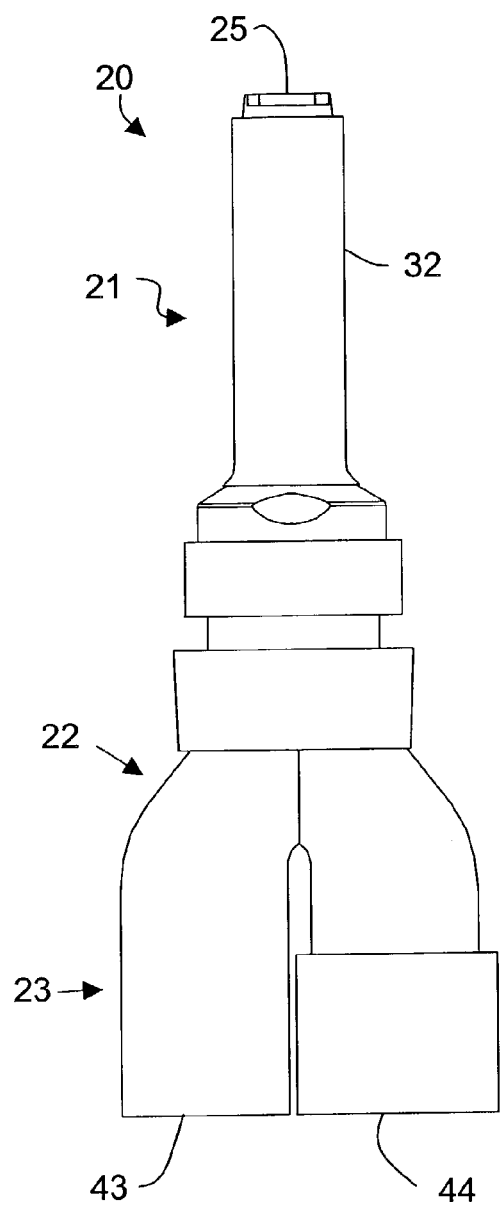

This application claims the benefit of provisional Application Ser. No. 60/361,046, filed Mar. 1, 2002, and entitled Wild Game Call Splitting System.

BACKGROUND OF THE INVENTION

1. Field

The invention is in the field of wild game calls.

2. State of the Art

Animals of most wild game species, such as elk, whitetail deer, mule deer, moose, antelope, coyote, bear, ducks, geese, and turkeys produce vocal calls which attract other animals of the species to the one making the call. Hunters and photographers have found that if they can imitate an animal's call, they are able to attract such animals. However, if the attempted call does not accurately simulate the real call, rather than attracting the animals, it can actually alert the animal to a perceived dangerous situation. Many types of wild game call devices have been developed to help a person simulate the call of a particular animal and are currently available for a variety of animals. However, most of these are difficult to use to produce natural sounding calls.

U.S. Pat. Nos. 5,735,725, 5,885,125, and 6,413,140 show a modular game call system having a mouthpiece section that includes a reed or membrane for creating the sound, a intermediate tubular section, and a sound chamber section. The mouthpiece section creates the sound while the tubular section and sound chamber section modify the sound created by the mouthpiece section so the sound produced more closely simulates the natural sounds produced by the animal being called. The reed or membrane in the mouthpiece may be likened to the animal's vocal chords, while the tubular section and sound chamber may be likened to the throat of the animal and the mouth or nose of the animal. These enhance the resonance and quality of tones produced.

With the modular system of the cited patents, the mouthpiece, tubular section, and sound chamber can all be interchanged with other such parts so as to vary the sound produced as desired by the user. Thus, different sound chambers used with the same mouthpiece and tubular section will produce different sounds. Similarly, different tubular sections with the same mouthpiece and sound chamber will produce a different quality of sound. The particular mouthpiece used will generally have a relatively large effect on the sound produced and generally the particular mouthpiece used will determine the particular type of animal sound made. For example, one mouthpiece may be used to create an elk call and a different mouthpiece will be used to create a deer or moose call. Generally, the mouthpiece used will create the same animal sound while the tubular section and sound chamber will give tonal qualities to the sound which will make the sound natural sounding and effective to call game. If an unnatural sound is produced that sound, rather than calling the animals, will actually alert them to an unnatural or dangerous situation.

SUMMARY OF THE INVENTION

According to the invention, a game call splits a single inlet air passage into a plurality of outlet air passages so that the sound generated by the game call exits the game call through at least two outlet passages. In this way, two or more sounds are combined to form the final sound generated by the call. It has been found that this produces a more natural animal sound than the sound produced with a single sound outlet. This may be because, even though sound produced by an animal generally emanates through the animal's mouth, the animal also has nasal outlet passages that probably have some effect on the sound produced. Thus, an animal has more than a single sound outlet passage and the sound produced by an animal's vocal chords is directed into more than one passage.

The calls of the invention includes a single air passage having an inlet portion with an inlet into which a user blows. A sound generating element, such as a membrane or reed, may be provided in the single air passage and cooperates with the air passage to generate a sound. Alternately, the user can generate the sound which is then transmitted to the single air passage with the air that the user blows into the single air passage. This sound is generated in, or passes through, the single air passage portion of the call. The single air passage is then split into a plurality of outlet air passages, preferably two or three outlet passages, by a splitter connecting the single air passage to or dividing the single air passage into the plurality of outlet passages. This splitter generally merely takes the form of a connection of the plurality of outlet passages to the single air passage.

It is preferred that the outlet passages each include a sound chamber that extends the outlet passage and modifies the characteristics of the outlet passage to modify the sound characteristics of the sound traveling through the outlet passage. The sound chambers will usually be extensions of the outlet passages and may include enlarged portions, such as bulbous enlargements of the passage, but can take various other forms.

In order to give a user flexibility and the ability to customize the sound produced by the call as desired by the user, it is preferred to provide the call as a modular call. In such instance, the call includes a single air passage portion or mouthpiece which forms the inlet portion of the air passage, a splitter which divides the single air passage from the mouthpiece into a plurality of air passages, and sound chambers for attachment to one or more of the plurality of outlet passages from the splitter.

THE DRAWINGS

Figure 2:
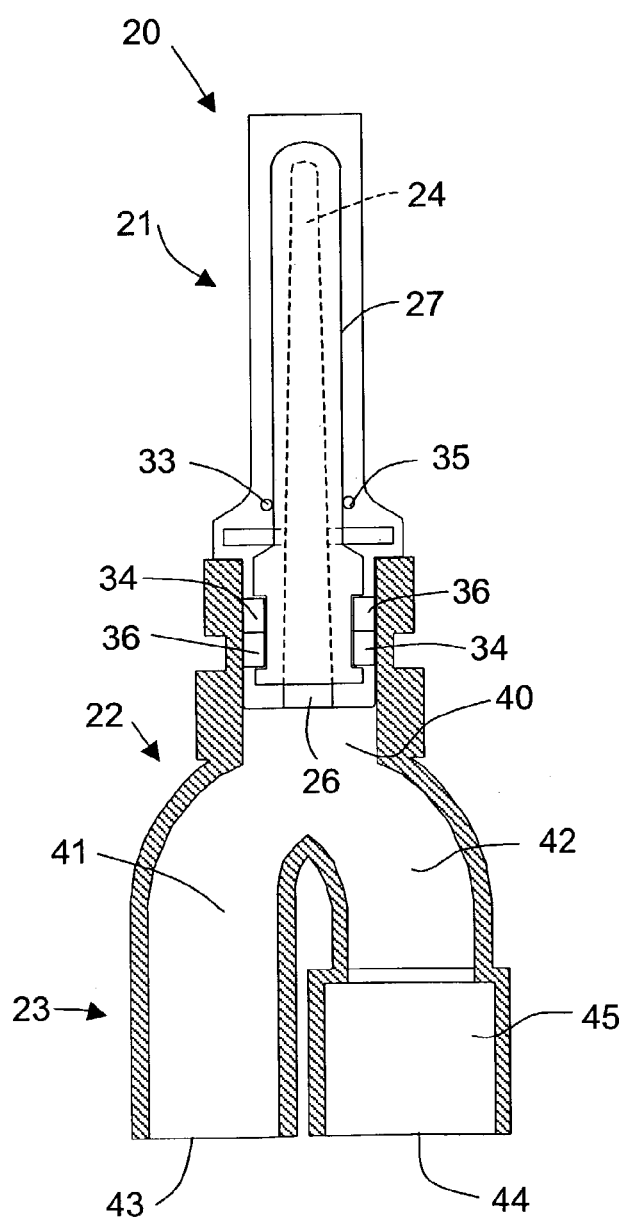
Figure 3:
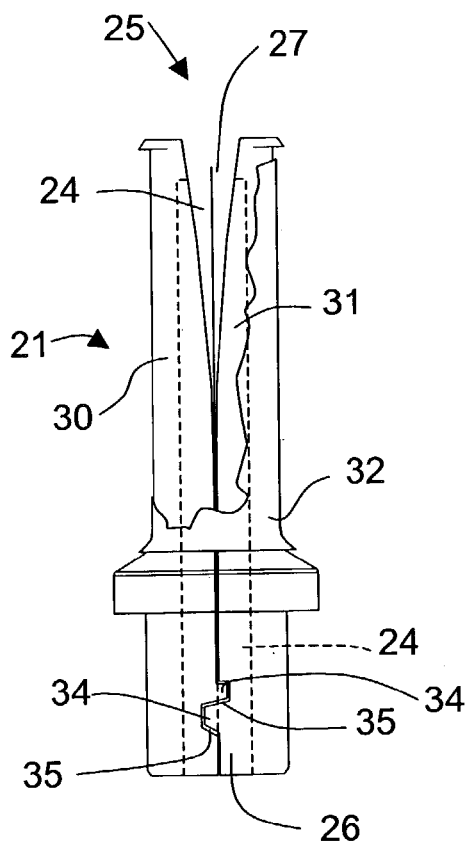
Figure 4:
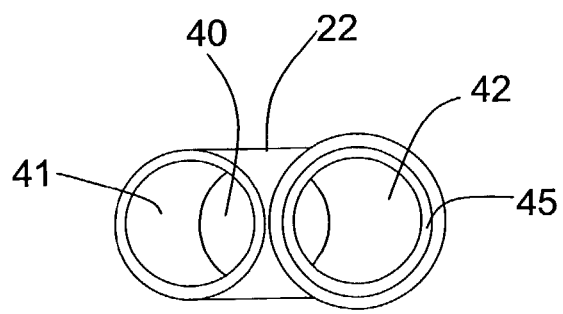
Figure 7:
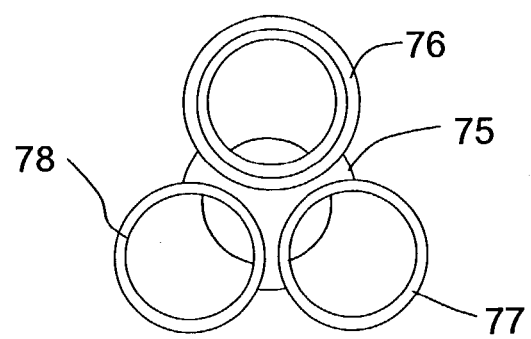
Figure 5:
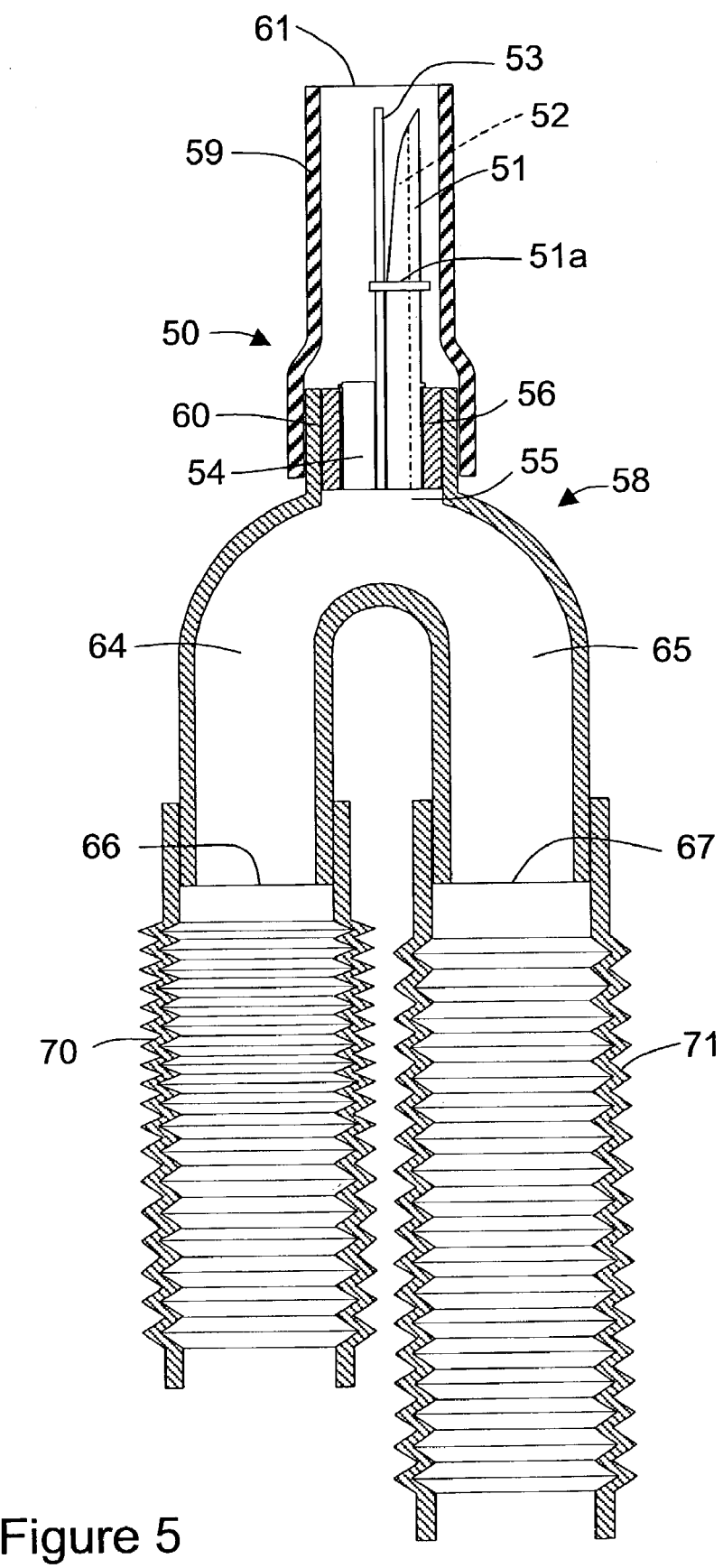
Figure 6:
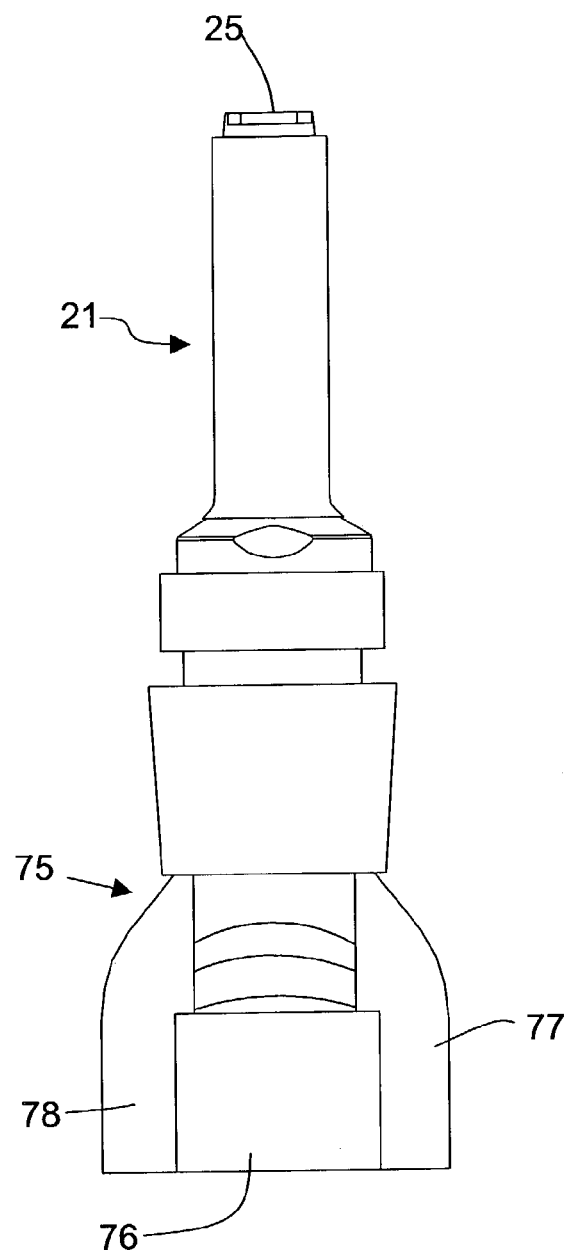
Figure 8:
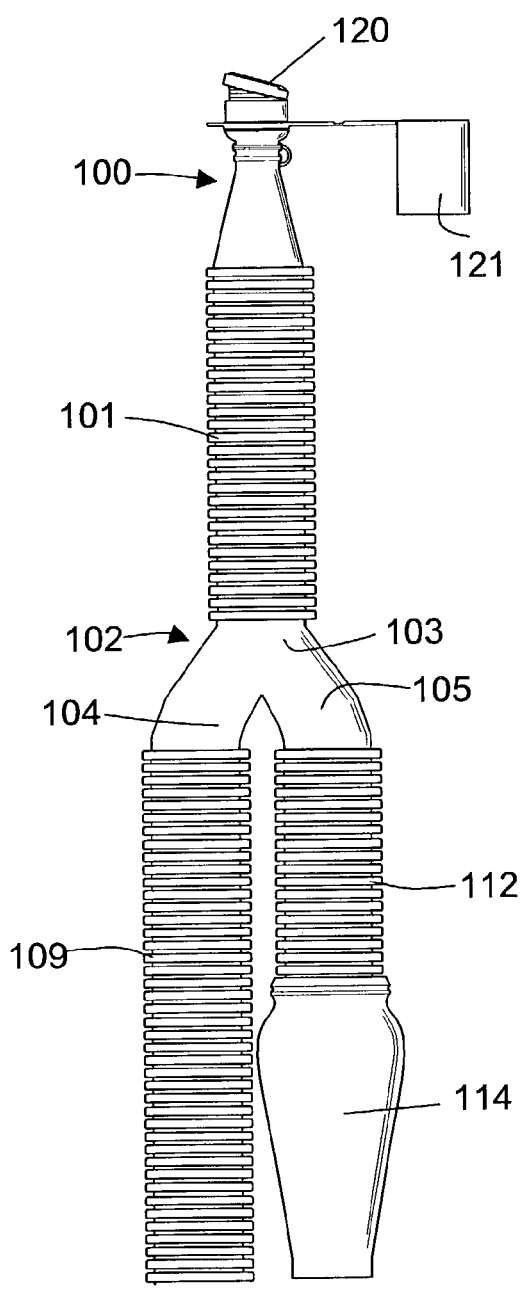
Figures 9, 10:
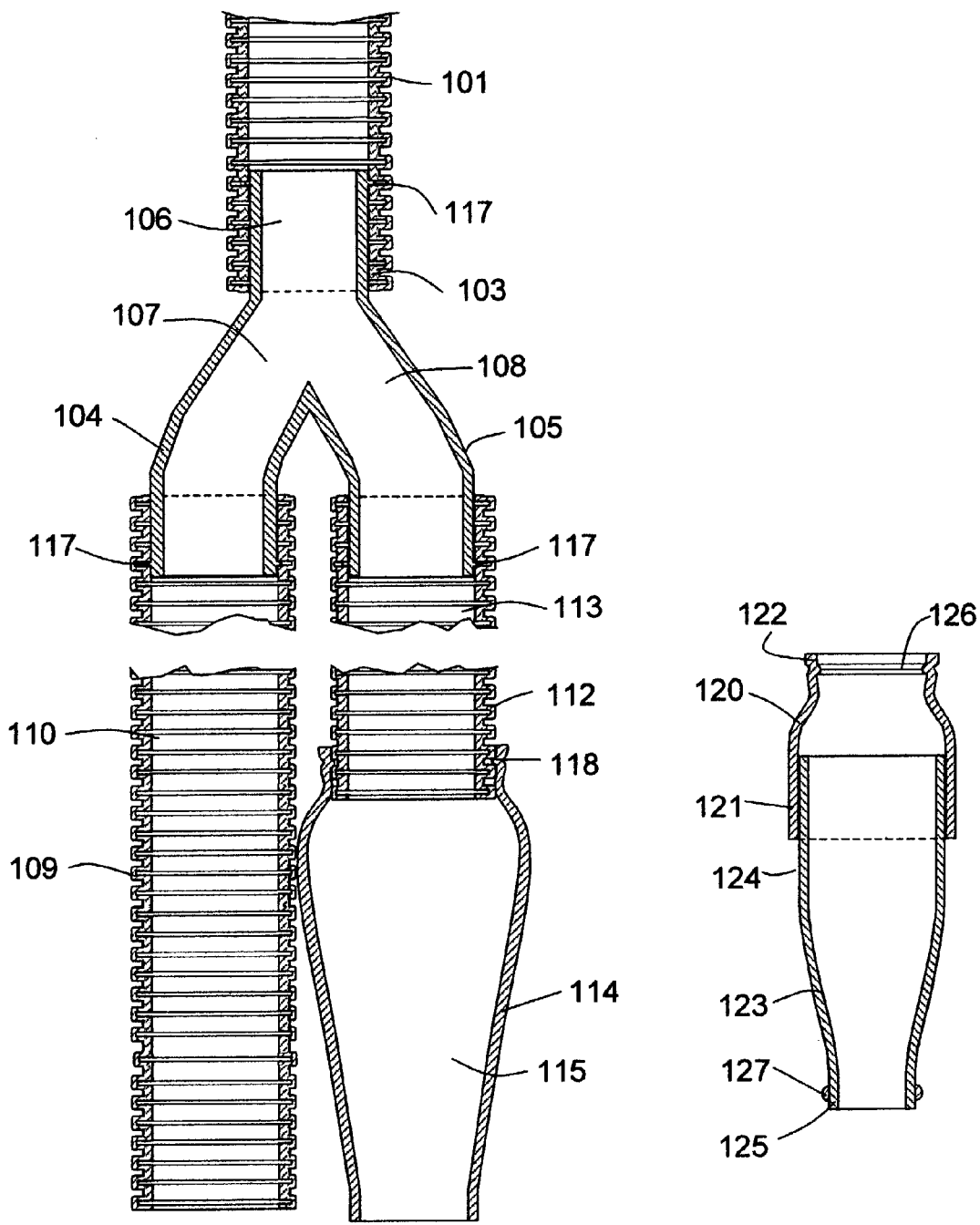

In the accompanying drawings, which show the best mode currently contemplated for carrying out the invention:

FIG. 1 is a side elevation of a wild game call of the invention wherein the single inlet air passage is split into two outlet passages;

FIG. 2, a vertical section through the call of FIG. 1 looking in the same direction as in FIG. 1;

FIG. 3, a side elevation of the single air passage portion of the call of FIGS. 1 and 2 removed from the splitter portion and having a portion of the outer elastic sleeve broken away;

FIG. 4, an end elevation of the call of FIGS. 1 and 2 looking toward the outlet end;

FIG. 5, a section through a second embodiment of wild game call of the invention;

FIG. 6, a side elevation similar to that of FIG. 1, showing a third embodiment of wild game call of the invention wherein the single inlet air passage is split into three outlet passages;

FIG. 7, an end elevation of the call of FIG. 6 looking toward the outlet end;

FIG. 8, a side elevation of a fourth embodiment of wild game call of the invention;

FIG. 9, a fragmentary section through portions of the wild game call of FIG. 8; and FIG. 10, a section through an improved bulbous sound chamber of the invention.

DETAILED DESCRIPTION OF THE ILLUSTRATED EMBODIMENTS

FIGS. 1-4 show an embodiment of a wild game call 20 of the invention which may be used for a deer call or a duck or similar animal call 20. The call 20 includes a single air passage portion 21, a splitter portion 22, and a sound chamber portion 23. A single air passage 24 extends through the single air passage portion 21 and has an air inlet 25 into which a user blows and an air outlet 26 from which air flows. Generally, the single air passage 24 will include a sound generation element therein, here shown as a reed 27, which vibrates to generate sound when a user blows into the air passage 24. Although the reed 27 in the particular configuration shown extends across a portion of the air passage 24 and, in effect, divides it in half, the air passage 24 remains a single air passage for purposes of the invention. The reed is merely a sound generating element in the single passage. In some instances, a user will not want a sound generation element in the single air passage as the user desires to generate his or her own sounds using his or her own vocal cords and transmit that sound into the call device by blowing into the passage 24, or a user can use a separate sound generation element that the user places in his or her mouth and the sounds generated are again transmitted into the passage 24 by blowing into the passage as the sound is separately generated in the users mouth. Also, a variety of sound generating elements other than a reed may be used in the passage 24, such as a membrane or any other known sound generating element. A particular sound generating element, or a particular mouthpiece assembly, will be chosen for a particular animal to be called. Thus, a particular mouthpiece assembly or a particular sound generating element in the mouthpiece assembly will result in a deer call while another mouthpiece assembly or another sound generating element in the particular mouthpiece assembly will result in a duck call.

The single air passage portion of the call of the invention may be a commercially available call mouthpiece assembly available separately or as part of a modular wild game call. In the embodiment shown in FIGS. 1-4, the particular single air passage portion shown with sound generating reed is an elk call mouthpiece assembly available from Sceery Outdoors of Santa Fe, N. Mex. Similar mouthpiece assemblies are also available from various other manufactures. This particular assembly includes two halves 30 and 31, FIG. 3, which are butted together with the reed 27 positioned and held sandwiched between the two halves. The halves 30 and 31 are held together by resilient sleeve 32. Sleeve 32 can be removed so the halves can be separated and the reed changed when desired or necessary. As known, different reed characteristics will create different sounds. Thus, the reed can be changed to change the sound. Also, the reed may have to be changed if it becomes damaged. An aligning pin 33, FIG. 2, and aligning tabs 34, FIGS. 2 and 3, on each half fit into pin receiving aligning hole 35 and tab receiving recesses 36 of the opposite half to align and hold the halves in proper assembled orientation with respect to each other and to align and hold the reed 27 in position between the pins 33 and tabs 34 with respect to and between the two halves. The commercially available mouthpiece in the prior art is normally removably attached to a tubular extension with a single passage therethrough which serves as a sound chamber in which the sound produced in the single air passage by the reed resonates to form a desired sound.

With the call of the invention, the mouthpiece or single air passage portion is attached to a splitter portion which splits the single air passage from the mouthpiece into a plurality of outlet air passages. This splitting of the single air passage into a plurality of air passages is the key to the invention. Thus, rather than a single air passage in which the sound produced resonates, even if that passage proceeds serially through several sound chambers, the invention provides a plurality of parallelly connected passages through which the sound simultaneously passes. This combines the resonances produced in the plurality of passages to form the final output sound. This is believed to produce a sound much more closely resembling the actual animal sound trying to be reproduced than the single passage of the prior art. Excellent results have been obtained using calls of the invention.

As shown in FIGS. 1-4, the splitter 22 has a single inlet passage 40 which communicates with the outlet 26 of passage 24 from the single air passage portion 21 and divides the passage 40 into two outlet passages 41 and 42. These outlet passages may be of any desired length, but will generally have a length which allows the sound to resonate in the respective outlet passage. This sound exits from the outlet ends 43 and 44 of the outlet passages where the sound from each passage combines to produce the resulting sound from the call of the invention. The outlet passages may be of various lengths and sizes and the length and/or size of one outlet passage may be different from that of another outlet passage of the same call. Thus, outlet passage 42 may have an end portion 45 of increased diameter which will change the resonance and thus the tone qualities of the sound emanating from outlet 44 as opposed to the qualities of the sound emanating from outlet 43. It is this slight difference in sound from the different passages that allows the invention to produce sounds with subtle differences over the sounds from prior art calls with a single outlet passage. Subtle differences result just from the plurality of outlet passages, even where each of the plurality of outlet passages are the same, and variation of the differences are produced by introducing differences in the respective passages. Satisfactory smaller calls such as duck calls in the configuration of FIGS. 1-4 have been found to produce very natural sounds with a total call length of about four inches, the exposed portion of the mouthpiece making up about one and three quarters inches of the total length, and the outlet passages being at least about three quarters of an inch in length. The smaller outlet passages have been found satisfactory when about one half inch in diameter. The larger diameter portion shown is about three quarters of an inch. While currently preferred dimensions are given as examples, the various dimensions can vary greatly.

While for smaller calls such as shown in FIGS. 1-4, the length of the outlet passages may generally be relatively short (down to about three quarters of an inch) and still provide desired resonance of the sound, sound chambers in the form of tubular extensions or enlarged chambers may be desired and used with such calls. For example, as shown in FIG. 5, a deer grunt call has a single air passage portion or mouthpiece portion 50 which includes a commercially available reed sound generating element, such as available from Primos, Inc. of Jackson, Miss., with half cylindrical body 51 having a single air passage 52 therein, reed 53, and lower half cylindrical body plug 54 which fits with the lower portion of body 51 into inlet passage 55 of splitter 56 formed by sleeve 57. Reed 53 is sandwiched in secured position between the lower portion of body 51 and body plug 54. An O-ring 51a can be moved along body 51 to set the length of reed 53 that is free to vibrate to change the sound produced by the sound generating element. A cover 59 fits over the top portion 60 of the splitter 58 to cover the sound generating element and provide an inlet 61 through which a user can blow into the passage 52. It should be noted that passage 52 is the only air passage connecting to the inlet 55 of splitter 58.

Splitter 58 splits inlet passage 55 into two outlet passages 64 and 65 with outlets 66 and 67, respectively. Sound chambers 70 and 71, in the form of expandable plastic tubing, are frictionally attached to the ends of splitter outlet passages 64 and 65. The tubing can be expanded to desired lengths to produce the sound chambers with desired resonance. As shown, the tubes may be expanded to create sound chambers of different lengths, chamber 71 being shown longer than chamber 70. To more securely attach the tubing forming sound chambers 70 and 71 to the ends of passages 64 and 65, various securement means such as an outwardly extending flange around the end of each passage 64 and 65 could mate with a receiving recess in the ends of the tubes forming chambers 70 and 71 when such tubes are slid over the ends of the passages.

The embodiments of FIGS. 1-5 show splitters that split the single air inlet passage into two outlet passages. FIGS. 6 and 7 show a wild game call similar to that of FIGS. 1-4, with the same single air passage portion 21 with inlet 25, but with a splitter 75 that splits the single air passage into three outlet passages 76, 77, and 78. Passage 76 has an enlarged portion similar to the enlarged portion 45 of FIGS. 1-4, although various other combinations could be used.

FIGS. 8 and 9, show a larger wild game call such as used for calling bull elk or bull moose. The larger calls usually produce louder sounds than do the smaller calls, and therefore need larger sound or resonating chambers. The call of FIG. 8 includes a single air passage portion or mouth piece 100, a flexible tubular connection 101 connecting the mouth piece 100 to the splitter portion 102, and continuing the single air passage from the mouth piece 100 to the single passage inlet of splitter portion 102. Splitter 102 has a single inlet arm 103 connected to flexible tube 101 and two outlet arms 104 and 105. Splitter 102 splits the single inlet air passage 106 into two outlet passages 107 and 108, FIG. 8. While a split into two outlet passages is shown, a split into three or more passages could be used. Flexible tube 109 is attached to splitter arm 104 and forms a tubular sound chamber 110 extending from outlet passage 107 and flexible tube 112 is attached to splitter arm 105 and forms a tubular sound chamber 113 extending from outlet passage 108. A bulbous shell 114 is attached to the end of tube 112, and forms a bulbous sound chamber 115. This bulbous shaped sound chamber modifies the sound traveling through it differently than does the tubular sound chamber. As shown in FIG. 9, the ends of splitter arms 103, 104 and 105 fit into the ends of flexible tubes 101, 109, and 112, respectively. The ends of splitter arms 103, 104, and 105 have flanges or rings 117 extending circumferentially outwardly therefrom to fit into corrugations of the flexible tubes to secure the flexible tubes thereto. Bulbous sound chamber shell 114 fits over the end of flexible tube 112, and has a flange or ring 118 extending circumferentially inwardly to fit into a corrugation of tube 112 to secure the bulbous shell to the end of the tube 112. A satisfactory elk call can be made in the configuration of FIGS. 8 and 9, with tube 101 being six and one half inches long, tube 109 being about eleven and one half inches long, and tube 112 being about five inches long. Splitter 102 adds about three and one half inches to the overall length of the call, as does the mouthpiece. Thus, the overall length of the call is between twenty five and twenty six inches long. The inside diameter of the flexible tubes may be about one and one half inches. Again, the dimensions are given as examples and may vary widely.

The mouthpiece 100 is a commercially available mouthpiece and the bulbous shell 114 is also a commercially available sound chamber. Both the mouthpiece 100 and bulbous shell 114 are available as parts or modules for modular PRIMOS® Hunting Calls from Primos, Inc. of Jackson, Miss., and are shown and described in U.S. Pat. Nos. 5,735,725; 5,885,125; and 6,413,140. The Primos mouthpiece has a preformed membrane 120 which serves as the sound generating element and has a single inlet air passage therethrough. A protective top cover 121 can be placed over membrane 120 when not in use to protect the membrane and close the inlet to the air passage. In the Primos modular wild game call as shown in the referenced patents, a flexible tube is attached to and extends from the mouthpiece and the bulbous sound chamber is attached to the end of the tube to provide a single air passage from the sound producing element in the mouthpiece, which extends through the flexible tube sound chamber, and then through the bulbous sound chamber to the atmosphere.

FIG. 10 shows an improved bulbous shell forming an adjustable bulbous sound chamber. The bulbous shell is formed of first shell portion 120 having a large end 121 and a small end 122 and a second shell portion 123 which has a large end 124 that telescopes into the large end 121 of the first shell portion and a small end 125. By telescoping the two shell portions together, the sound chamber is made smaller and by telescoping the two shell portions apart, the sound chamber is enlarged. The two telescoping large ends have a frictional fit so that when adjusted to the desired telescoped position, the shells will generally maintain such position unless manually telescoped to a new position. For more secure adjustment, the outside of large end 124 could have a series of corrugations and the inside of the large end could have an inwardly extending flange or ring to engage a corrugation of end 124. With such arrangement, the telescoping adjustment is in steps as the ring moves from engagement of one corrugation to the next corrugation. The small end 122 of shell portion 120 is sized to fit over the end of a flexible tube and has an inwardly extending flange or ring 126 to engage a corrugation of the outside of the tube, while the small end 125 of shell portion 123 is sized to fit into the end of a flexible tube and has an outwardly extending flange or ring 127 to engage a corrugation of the inside of the tube. The bulbous sound chamber may have either end or both ends connected to flexible tubes with either end upstream and the size of the sound chamber may be adjusted. This arrangement provides substantial flexibility in adjusting the sound produced.

The calls of the invention may be of single piece construction, of modular construction, or various combinations. Modular construction allows a user to easily interchange various modular parts such as combining a particular desired mouthpiece with desired sound generating element with a desired splitter and adding or interchanging various desired sound chambers until a desired sound is achieved by the user. Users of the calls will have their own preferred sounds to be produced so that one user may prefer one combination of components that that user thinks provides the most natural sound while a different user will have a different combination of components to produce that user's preferred sound.

While various construction details of preferred calls of the invention have been shown, it should be understood that various other constructions can be used. Various different sound elements can be used with any particular call shown. Any number of outlet passages can be used. Thus, while embodiments with two or three outlet passages have been shown, four or more outlet passages may be user. The invention is in splitting the single inlet air passage into a plurality of outlet passages. Various ways of attaching the various modular parts together may be used. Where flanges are shown, tabs could be used. Any other known attachments systems could also be used. Also, while tubular passages of circular cross section have been shown, various passage cross sectional configurations could be used such as oval, rectangular, square, etc., or inserts to form oval, rectangular, square, etc. portions of the passages may be used. Also, various restrictions could be placed in the passages, if desired.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. A wild game call comprising:
   a single air passage portion having a single air passage therethrough with an air inlet into which a user blows, and an air outlet;
   a sound generation element in the single air passage to generate a sound when a user blows into the inlet of the single air passage in the single air passage portion;
   a splitting portion having a single air inlet passage attached in air flow communication to the air outlet of the single air passage portion and a plurality of outlet air passages, said splitting portion splitting the single inlet air passage into a plurality of outlet air passages wherein sound generated by the sound generation element in the single air passage is divided and transmitted into each of the plurality of outlet air passages; and
   a plurality of sound chambers each having an air inlet attached to one of the plurality of outlet air passages of the splitting portion, wherein at least one of the sound chambers is a bulbous chamber.

2. A wild game call according to claim 1, wherein the bulbous sound chamber is constructed of telescoping parts and the user can manually adjust the relative positions of the telescoping parts to adjust the size of the sound chamber.

3. A wild game call comprising:
   a single air passage portion having a single air passage therethrough with an air inlet into which a user blows, and an air outlet;
   a splitting portion having a single air inlet passage attached in air flow communication to the air outlet of the single air passage portion and a plurality of outlet air passages, said splitting portion splitting the single inlet air passage into a plurality of outlet air passages; and
   at least one bulbous sound chamber having an air inlet attached in airflow communication to one of the plurality of outlet air passages of the splitting portion.

4. A wild game call according to claim 3, wherein the bulbous sound chamber is constructed of telescoping parts and the user can manually adjust the relative positions of the telescoping parts to adjust the size of the sound chamber.

5. A wild game call according to claim 3, additionally including a sound generation element cooperable with the single air passage to generate a sound when a user blows into the inlet of the single air passage in the single air passage portion.

6. A wild game call comprising:
   a single air passage portion having a single air passage therethrough with an air inlet into which a user blows, and an air outlet;
   a sound generation element in the single air passage to generate a sound when a user blows into the inlet of the single air passage in the single air passage portion; and
   a splitting portion having a single air inlet passage attached in air flow communication to the air outlet of the single air passage portion and a plurality of outlet air passages, said splitting portion splitting the single inlet air passage into a plurality of outlet air passages wherein sound generated by the sound generation element in the single air passage is divided and transmitted into each of the plurality of outlet air passages, wherein the game call is of modular construction with the single air passage portion forming a module and the splitting portion forming a separate module attachable to the single air passage portion module, whereby a particular single air passage portion module may be attached to any of a selection of splitting portion modules.

7. A wild game call according to claim 6, additional including at least one sound chamber module attachable to the splitting portion module in air flow communication with a selected one of the plurality of outlet passages.

8. A modular wild game call comprising:
   a single air passage portion forming a module and having a single air passage therethrough with an air inlet into which a user blows, and an air outlet:
   a splitting portion forming a separate module and having a single air inlet passage attached in air flow communication to the air outlet of the single air passage portion and a plurality of outlet air passages, said splitting portion module attachable to the single air passage portion module and splitting the single inlet air passage into a plurality of outlet air passages whereby a particular single air passage portion module may be attached to any of a selection of splitting portion modules; and
   at least one sound chamber module forming a bulbous sound chamber attachable to the splitting portion module in air flow communication with a selected one of the plurality of outlet passages.

9. A wild game call according to claim 8, wherein the bulbous sound chamber is constructed of telescoping parts and the user can manually adjust the relative positions of the telescoping parts to adjust the size of the sound chamber.

10. A wild game call according to claim 7, wherein the at least one sound chamber module forms a tubular sound chamber.

11. A wild game call according to claim 10, wherein the at least one sound chamber module includes an tubular member which is manually length adjustable by a user.

12. A wild game call comprising:
    a single air passage portion having a single air passage therethrough with an air inlet into which a user blows and supplies sound waves generated outside the game call, and an air outlet; and
    a splitting portion having a single air inlet passage attached in air flow communication to the air outlet of the single air passage portion and a plurality of outlet air passages, said splitting portion splitting the single inlet air passage into a plurality of outlet air passages without sound generation elements therein wherein sound passing through the single air passage is divided and transmitted into each of the plurality of outlet air passages.

13. A wild game call according to claim 12, additionally including at least one sound chamber having an air inlet attached in airflow communication to one of the plurality of outlet air passages of the splitting portion.

14. A wild game call according to claim 13, additionally including a plurality of sound chambers each having an air inlet attached to one of the plurality of outlet air passages of the splitting portion.

15. A wild game call according to claim 12, wherein the game call is of modular construction with the single air passage portion forming a module and the splitting portion forming a separate module attachable to the single air passage portion module, whereby a particular single air passage portion module may be attached to any of a selection of splitting portion modules.

16. A wild game call according to claim 15, additional including at least one sound chamber module attachable to the splitting portion module in air flow communication with a selected one of the plurality of outlet passages.

* * * * *